(12) United States Patent
Lin et al.

(10) Patent No.: US 12,405,892 B2
(45) Date of Patent: Sep. 2, 2025

(54) ELECTRONIC APPARATUS AND COMMAND ACCESSING METHOD THEREOF HAVING POWER SAVING MECHANISM

(71) Applicant: REALTEK SEMICONDUCTOR CORPORATION, Hsinchu (TW)

(72) Inventors: Jui-Yuan Lin, Hsinchu (TW); Ying-Wei Wang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 18/669,585

(22) Filed: May 21, 2024

(65) Prior Publication Data
US 2024/0394188 A1    Nov. 28, 2024

(30) Foreign Application Priority Data
May 26, 2023   (TW) ................................. 112119724

(51) Int. Cl.
  *G06F 12/08*   (2016.01)
  *G06F 1/3234*  (2019.01)
  *G06F 12/0842* (2016.01)

(52) U.S. Cl.
  CPC ........ *G06F 12/0842* (2013.01); *G06F 1/3275* (2013.01); *G06F 2212/603* (2013.01)

(58) Field of Classification Search
  CPC ............ G06F 12/0842; G06F 12/0875; G06F 12/0895; G06F 12/08; G06F 2212/1028;
(Continued)

(56) References Cited

U.S. PATENT DOCUMENTS

| 12,217,059 | B1 * | 2/2025 | Freij ....................... G06F 9/381 |
| 2007/0113059 | A1 * | 5/2007 | Tran ........................ G06F 9/381 |
| | | | 712/E9.058 |

(Continued)

FOREIGN PATENT DOCUMENTS

| EP | 3001308 B1 * | 12/2017 | ............... G06F 9/38 |
| TW | 1506552 B   * | 11/2015 | ............... G06F 9/44 |
| TW | 201612744 A  | 4/2016 | |

OTHER PUBLICATIONS

OA letter of a counterpart TW application (appl. No. 112119724) mailed on Sep. 15, 2023. Summary of the TW OA letter: 1. Claims 1-10 are rejected as allegedly being unpatentable in view of cited reference 1 (TW 201612744 A, also published as US20160092230A1). Correspondence bewteen claims of TW counterpart application and claims of US application: 1. Claims 1, 3, . . . ,6 and 8-10 in TW counterpart application correspond to claims 1, 2-3, . . . and 8 in US application, respectively.

*Primary Examiner* — Tracy C Chan
(74) *Attorney, Agent, or Firm* — WPAT, PC

(57) ABSTRACT

The present disclosure discloses a command accessing method having power saving mechanism is provided that includes steps outlined below. A cache control circuit is controlled to retrieve a plurality of commands from a command source to be executed. A plurality of loop commands corresponding to a loop procedure included in the commands are determined, wherein the loop commands include a first part that matches a storage amount of a command buffer circuit and a second part that exceeds the storage amount. The cache control circuit is controlled to store the first part of the loop commands to the command buffer circuit and not store the second part of the loop commands to the command buffer circuit. The cache control circuit is controlled to, every time the loop procedure is performed, retrieve and execute the first part of the loop (Continued)

commands from the command buffer circuit and retrieve and execute the second part of the loop commands from the command source.

8 Claims, 3 Drawing Sheets

(58) Field of Classification Search
CPC ......... G06F 2212/603; G06F 2212/452; G06F 9/3806; G06F 9/30065; G06F 1/3275
See application file for complete search history.

(56) References Cited

U.S. PATENT DOCUMENTS

| | | | | |
|---|---|---|---|---|
| 2012/0124301 A1* | 5/2012 | Hardage | ............... | G06F 9/3806 |
| | | | | 711/E12.001 |
| 2015/0293577 A1* | 10/2015 | Hall | ........................ | G06F 9/325 |
| | | | | 713/320 |
| 2016/0092230 A1* | 3/2016 | Chen | ................... | G06F 9/30065 |
| | | | | 712/241 |
| 2022/0229664 A1* | 7/2022 | Arakawa | ............. | G06F 9/30043 |

* cited by examiner

ELECTRONIC APPARATUS AND COMMAND ACCESSING METHOD THEREOF HAVING POWER SAVING MECHANISM

BACKGROUND OF THE INVENTION

1. Field of the Invention

The present disclosure relates to an electronic apparatus and a command accessing method thereof having a power saving mechanism.

2. Description of Related Art

An electronic apparatus uses a processing circuit thereof to access commands and data from a memory connected thereto, to perform operation on the commands and the data so as to obtain the processed result in need. In recent years, the power-saving demands on the electronic products become higher and higher. A more efficient access method is therefore needed when the processing circuit accesses the commands from the memory in order to save power.

SUMMARY OF THE INVENTION

In consideration of the problem of the prior art, an object of the present disclosure is to provide an electronic apparatus and a command accessing method thereof having a power saving mechanism.

The present invention discloses a command accessing method having a power saving mechanism that includes steps outlined below. A cache control circuit is controlled to retrieve a plurality of commands from a command source to be executed. A plurality of loop commands that correspond to a loop procedure comprised in the commands are determined, wherein the loop commands comprise a first part having a size that matches a storage amount of a command buffer circuit and a second part that exceeds the storage amount of the command buffer circuit. The cache control circuit is controlled to store the first part of the loop commands to the command buffer circuit and not store the second part of the loop commands to the command buffer circuit. Every time the loop procedure is performed, the cache control circuit is controlled to retrieve and execute the first part of the loop commands from the command buffer circuit and retrieve and execute the second art of the loop commands from the command source.

The present invention also discloses an electronic apparatus having a power saving mechanism that includes a cache control circuit, a command buffer circuit and a processing circuit. The processing circuit is configured to perform steps outlined below. The cache control circuit is controlled to retrieve a plurality of commands from a command source to be executed. A plurality of loop commands that correspond to a loop procedure comprised in the commands are determined, wherein the loop commands comprise a first part having a size that matches a storage amount of the command buffer circuit and a second part that exceeds the storage amount of the command buffer circuit. The cache control circuit is controlled to store the first part of the loop commands to the command buffer circuit and not store the second part of the loop commands to the command buffer circuit. Every time the loop procedure is performed, the cache control circuit is controlled to retrieve and execute the first part of the loop commands from the command buffer circuit and retrieve and execute the second part of the loop commands from the command source.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide an electronic apparatus and a command accessing method thereof having a power saving mechanism to categorize loop commands into a first part having a size matching a storage amount of a command buffer circuit and a second part that exceeds the storage amount of the command buffer circuit such that only the first part is stored in the command buffer circuit. In the execution of every loop procedure, the first part of the loop commands is retrieved and executed from the command buffer circuit and the second part of the loop commands are retrieved and executed from a command source to save power.

Figure 1:
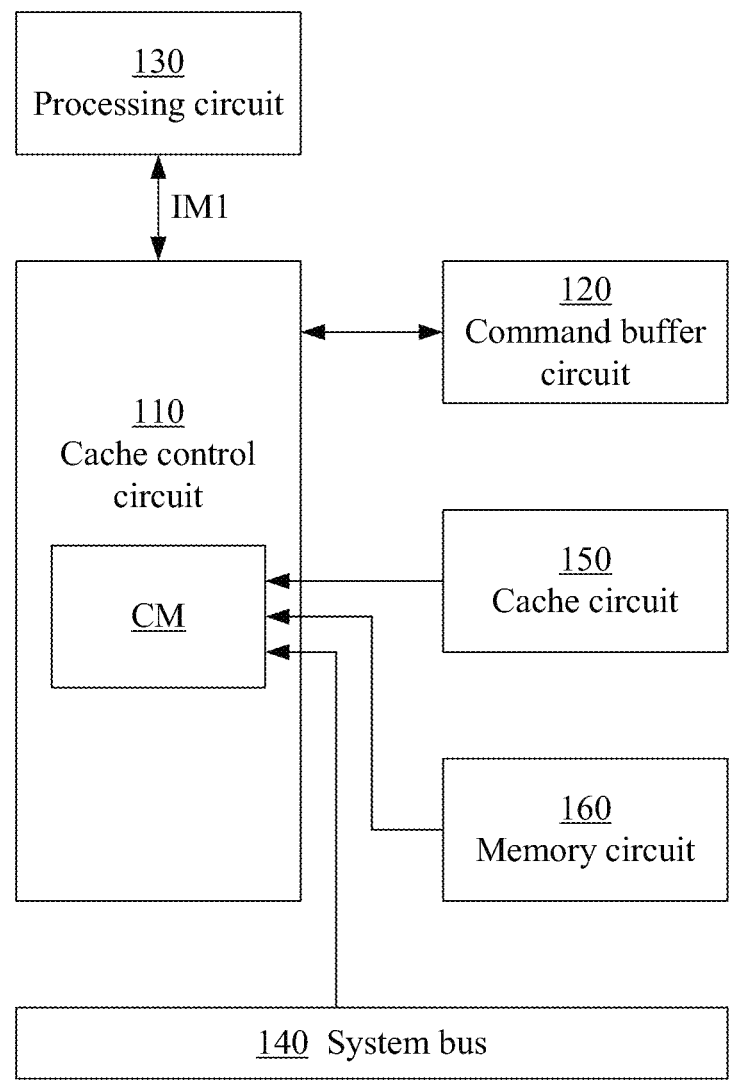
FIG. 1 illustrates a block diagram of an electronic apparatus having a power saving mechanism according to an embodiment of the present invention.

Reference is now made to FIG. 1. FIG. 1 illustrates a block diagram of an electronic apparatus 100 having a power saving mechanism according to an embodiment of the present invention. The electronic apparatus 100 includes a cache control circuit 110, a command buffer circuit 120 and a processing circuit 130.

In an embodiment, the processing circuit 130 is a core of a central processing unit (CPU) and is electrically coupled to the cache control circuit 110 to control the cache control circuit 110 to retrieve and execute commands CM from a command source. The command source can be such as, but not limited to a system bus 140, a cache circuit 150, a memory circuit 160 or a combination thereof further included in the electronic apparatus 100.

The processing circuit 130 determines that a plurality of loop commands that correspond to a loop procedure included in the commands CM, wherein the loop commands include a first part having a size that matches a storage amount of the command buffer circuit 120 and a second part that exceeds the storage amount of the command buffer circuit 120. More specifically, the storage amount of the command buffer circuit 120 can only store the first part, in which the second part is not able to be stored in the command buffer circuit 120 when the first part is already stored in the command buffer circuit 120.

Figure 2:
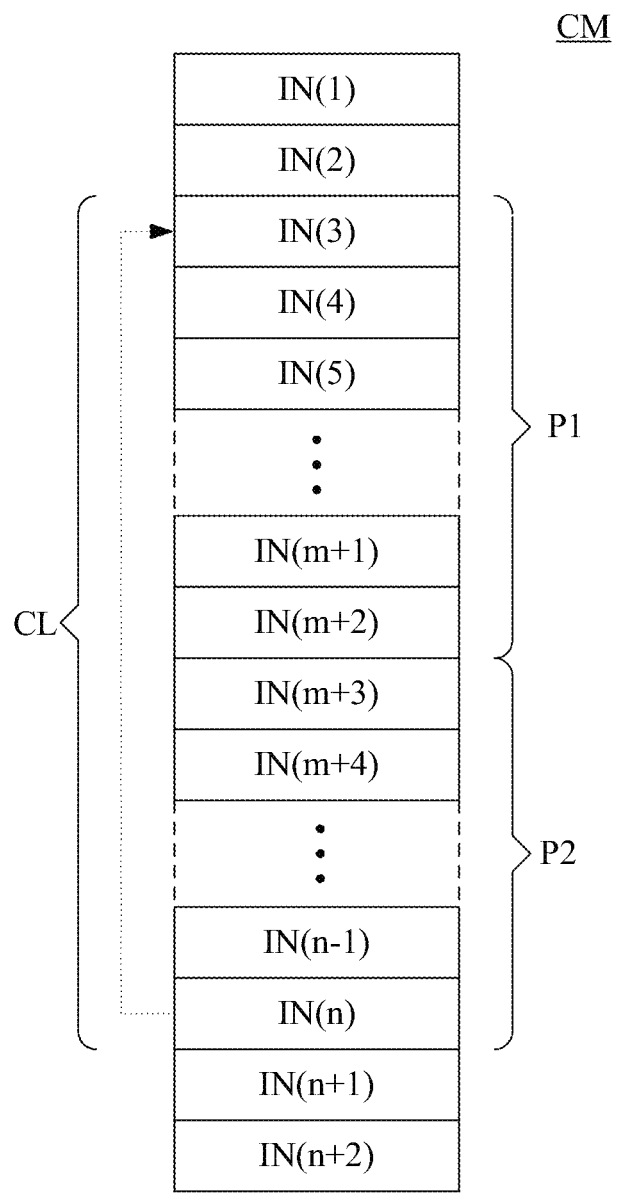
FIG. 2 illustrates a diagram of the commands that the cache control circuit retrieves according to an embodiment of the present invention.

Reference is now made to FIG. 2 at the same time. FIG. 2 illustrates a diagram of the commands CM that the cache control circuit 110 retrieves according to an embodiment of the present invention.

In an embodiment, the commands CM that the cache control circuit 110 retrieves include individual commands respectively labeled as IN(1)~IN(n+2) to be executed by the processing circuit 130 in series, in which n is an integer.

The processing circuit 130 that a current command that is being executed in the commands CM includes a branch request corresponding to a previous command, so as to further determine that the commands from the previous command to the current command are the loop commands CL.

For example, when the processing circuit 130 executes the command IN(n) and determines that the command IN(n) includes a branch request corresponding to the command IN(3), the processing circuit 130 further determines that the commands from the command IN(3) to the command IN(n) are the loop commands CL. These loop commands CL correspond to a loop procedure to be executed by the processing circuit 130 for a plurality of times. More specifically, the processing circuit 130 executes the loop procedure for a plurality of times, in which the commands from the command IN(3) to the command IN(n) are executed in series every time the loop procedure is executed.

In an embodiment, the command buffer circuit 120 is a register having a plurality of D flip-flops configured to store at least a part of the loop commands CL. Since the storage amount of the command buffer circuit 120 is limited, not all the loop commands CL can be stored therein when the amount of the loop commands CL is larger than the storage amount of the command buffer circuit 120.

As a result, the processing circuit 130 calculates a branch jump distance from the previous command to the current command, in which the branch jump distance equals to the amount of these loop commands CL. Take the condition described above as an example, the processing circuit 130 calculates the branch jump distance from the command IN(3) to the command IN(n) to be n−3+1=n−2.

Moreover, the processing circuit 130 controls the cache control circuit 110 to determine a first part P1 and a second part P2 of the loop commands CL according to the branch jump distance and the storage amount of the command buffer circuit 120. The first part P1 is a part of the commands in the loop commands CL has a size that matches the storage amount of the command buffer circuit 120. The second part P2 is the other part of the commands in the loop commands CL that exceeds the storage amount of the command buffer circuit 120.

Take FIG. 2 as an example, when the storage amount of the command buffer circuit 120 only allows an amount of m loop commands to be stored, the commands from the command IN(3) to the command IN(m+2) correspond to the first part P1 of the loop commands CL. The commands from the command IN(m+3) to the command IN(n) correspond to the second part P2 of the loop commands CL, in which m is a positive integer smaller than n.

The processing circuit 130 controls the cache control circuit 110 to store the first part P1 of the loop commands CL to the command buffer circuit 120, and not store the second part P2 of the loop commands CL to the command buffer circuit 120.

Further, every time the loop procedure is performed, the processing circuit 130 controls the cache control circuit 110 to retrieve and execute the first part P1 of the loop commands CL from the command buffer circuit 120, and retrieve and execute the second part P2 of the loop commands CL from the command source.

More specifically, when the processing circuit 130 executes the commands from the command IN(3) to the command IN(n), only the first time is executed by controlling the cache control circuit 110 to retrieve the commands from the command IN(3) to the command IN(n) directly from the command source (e.g., the system bus 140, the cache circuit 150, the memory circuit 160 or a combination thereof). Subsequently, every time the loop procedure is executed, the processing circuit 130 controls the cache control circuit 110 to retrieve and execute the commands from the command IN(3) to the command IN(m+2) (corresponding to the first part P1 of the loop commands CL) from the command buffer circuit 120 instead of the original command source. Further, the processing circuit 130 controls the cache control circuit 110 to retrieve and execute the commands from the command IN(m+3) to the command IN(n) (corresponding to the second part P2 of the loop commands CL) from the command source.

It is appreciated that when the amount of the loop commands CL is smaller than the storage amount of the command buffer circuit 120, the command buffer circuit 120 is able to store all the loop commands CL. As a result, the loop commands CL only includes the first part P1, and the second part P2 does not exist. Under such a condition, the processing circuit 130 stores all the loop commands CL in the command buffer circuit 120, such that every time the loop procedure is executed, the processing circuit 130 controls the cache control circuit 110 to retrieve and execute the loop commands CL from the command buffer circuit 120.

The original object of the command buffer circuit is to store the loop commands such that the processing circuit can quickly access the commands in the loop procedure from the command buffer circuit instead of the original command source so as to save power. However, in some approaches, the processing circuit controls the cache control circuit to directly store all the loop commands in the command buffer circuit. When the storage amount of the command buffer circuit is not able to store all the commands, the cache control circuit keeps overwriting the loop commands that are already stored in the command buffer circuit with the subsequently commands. When the loops procedure is executed again, the cache control circuit is not able to access the correct loop commands from the command buffer circuit and has to access the loop commands from the original command source. Such a strategy cannot save power.

As a result, the electronic apparatus having the power saving mechanism of the present invention categorizes loop commands into a first part having a size matching a storage amount of a command buffer circuit and a second part that exceeds the storage amount of the command buffer circuit such that only the first part is stored in the command buffer circuit. In the execution of every loop procedure, the first part of the loop commands is retrieved and executed from the command buffer circuit and the second part of the loop commands are retrieved and executed from a command source to save power.

Figure 3:
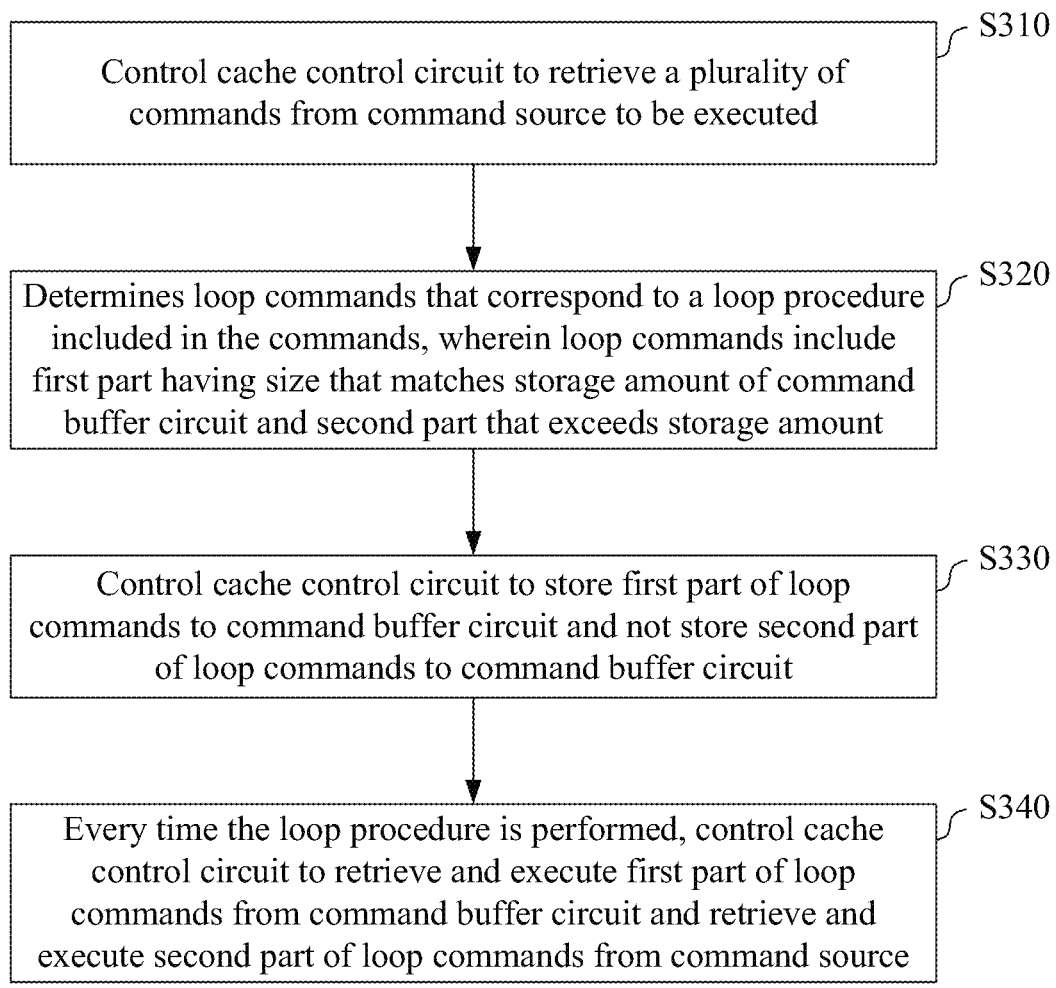
FIG. 3 illustrates a flow chart of a command accessing method having a power saving mechanism according to an embodiment of the present invention.

Reference is now made to FIG. 3. FIG. 3 illustrates a flow chart of a command accessing method 300 having a power saving mechanism according to an embodiment of the present invention.

Besides the apparatus described above, the present invention further discloses the command accessing method 300 that can be used in such as, but not limited to the electronic apparatus 100 illustrated in FIG. 1. An embodiment of the command accessing method 300 is illustrated in FIG. 3 and includes the steps outlined below.

In step S310, the processing circuit 130 controls the cache control circuit 110 to retrieve the commands CM from the command source to be executed.

In step S320, the processing circuit 130 determines the loop commands CL that correspond to the loop procedure included in the commands CM, wherein the loop commands CL include the first part P1 having the size that matches the storage amount of the command buffer circuit 120 and the second part P2 that exceeds the storage amount of the command buffer circuit 120.

In step S330, the processing circuit 130 controls the cache control circuit 110 to store the first part P1 of the loop commands CL to the command buffer circuit 120 and not store the second part P2 of the loop commands CL to the command buffer circuit 120.

In step S340, every time the loop procedure is performed, the processing circuit 130 controls the cache control circuit 110 to retrieve and execute the first part P1 of the loop commands CL from the command buffer circuit 120 and retrieve and execute the second part P2 of the loop commands CL from the command source.

It is appreciated that the embodiments described above are merely an example. In other embodiments, it is appreciated that many modifications and changes may be made by those of ordinary skill in the art without departing, from the spirit of the invention.

In summary, the electronic apparatus and the command accessing method thereof having the power saving mechanism categorize loop commands into a first part having a size matching a storage amount of a command buffer circuit and a second part that exceeds the storage amount of the command buffer circuit such that only the first part is stored in the command buffer circuit. In the execution of every loop procedure, the first part of the loop commands is retrieved and executed from the command buffer circuit and the second part of the loop commands are retrieved and executed from a command source to save power.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A command accessing method having a power saving mechanism, comprising:
    controlling a cache control circuit to retrieve a plurality of commands;
    determining a plurality of loop commands that correspond to a loop procedure comprised in the commands, wherein the loop commands comprise a first part having a size that matches a storage amount of a command buffer circuit and a second part that exceeds the storage amount of the command buffer circuit;
    controlling the cache control circuit to store the first part of the loop commands to the command buffer circuit and not store the second part of the loop commands to the command buffer circuit; and
    every time the loop procedure is performed, controlling the cache control circuit to retrieve and execute the first part of the loop commands from the command buffer circuit and retrieve and execute the second part of the loop commands.

2. The command accessing method of claim 1, wherein the command buffer circuit is a register having a plurality of D flip-flops.

3. The command accessing method of claim 1, further comprising:
    determining that a current command that is being executed in the commands comprises a branch request corresponding to a previous command, so as to further determine that the commands from the previous command to the current command are the loop commands.

4. The command accessing method of claim 3, further comprising:
    calculating a branch jump distance from the previous command to the current command; and
    controlling the cache control circuit to determine the first part and the second part of the loop commands according to the branch jump distance and the storage amount of the command buffer circuit.

5. An electronic apparatus having a power saving mechanism, comprising:
    a cache control circuit;
    a command buffer circuit; and
    a processing circuit configured to:
        control the cache control circuit to retrieve a plurality of commands
        determine a plurality of loop commands that correspond to a loop procedure comprised in the commands, wherein the loop commands comprise a first part having a size that matches a storage amount of the command buffer circuit and a second part that exceeds the storage amount of the command buffer circuit;
        control the cache control circuit to store the first part of the loop commands to the command buffer circuit and not store the second part of the loop commands to the command buffer circuit; and
        every time the loop procedure is performed, control the cache control circuit to retrieve and execute the first part of the loop commands from the command buffer circuit and retrieve and execute the second part of the loop commands.

6. The electronic apparatus of claim 5, wherein the command buffer circuit is a register having a plurality of D flip-flops.

7. The electronic apparatus of claim 5, wherein the processing circuit is further configured to:
    determine that a current command that is being executed in the commands comprises a branch request corresponding to a previous command, so as to further determine that the commands from the previous command to the current command are the loop commands.

8. The electronic apparatus of claim 7, wherein the processing circuit is further configured to:
    calculate a branch jump distance from the previous command to the current command; and
    control the cache control circuit to determine the first part and the second part of the loop commands according to the branch jump distance and the storage amount of the command buffer circuit.

* * * * *